United States Patent [19]

Kikuchi et al.

[11] Patent Number: 5,194,485

[45] Date of Patent: Mar. 16, 1993

[54] RUBBER COMPOSITION FOR TIRE TREAD

[75] Inventors: Yasushi Kikuchi, Odawara; Masayoshi Daio, Hiratsuka; Kazuyoshi Kayama, Yokohama; Hideyuki Oishi, Hiratsuka; Shuichi Akita, Yokohama; Fumitoshi Suzuki, Yokohama, all of Japan

[73] Assignees: The Yokohama Rubber Co., Ltd.; Nippon Zeon Co., Ltd., both of Tokyo, Japan

[21] Appl. No.: 770,033

[22] Filed: Oct. 4, 1991

Related U.S. Application Data

[63] Continuation of Ser. No. 471,443, Jan. 29, 1990, abandoned.

[30] Foreign Application Priority Data

Jan. 30, 1989 [JP] Japan .................. 1-17525

[51] Int. Cl.$^5$ .......................... C08K 3/04; C08L 9/06
[52] U.S. Cl. ........................ 524/526; 524/495; 524/496; 525/236; 525/237; 152/209 R; 152/450
[58] Field of Search ............ 524/495, 496, 526; 526/340; 525/237, 236

[56] References Cited

U.S. PATENT DOCUMENTS 4,677,165  6/1987  Kikuchi et al. .............. 525/332.9
4,945,964  8/1990  Takiguchi et al. ............ 525/237 X

FOREIGN PATENT DOCUMENTS 0045340  3/1984  Japan ........................... 525/237

OTHER PUBLICATIONS

Henderson, Styrene-Butadiene Rubbers, Rubber Technology, Morton (ed.), van Nostrand Reinhold, N.Y., 226-7 (1987).
Rubber World, published Dec. 1988 "Dynamic behavior of compounds containing highly reinforcing carbon blacks with equilibrium cure system", by E. H. Tan and S. Wolff.

Primary Examiner—Fred Teskin
Attorney, Agent, or Firm—Nikaido, Marmelstein, Murray & Oram

[57] ABSTRACT

A rubber composition for tire treads which comprises 100 parts by weight of a rubber component comprising 10 to 100 parts by weight of a styrene-butadiene copolymer rubber produced by a solution polymerization and 90 to 0 parts by weight of at least one of other diene rubbers having a glass transition temperature (Tg) of −60° C. at lowest, and at least 70 parts by weight of a carbon black mixed in the rubber component, the styrene-butadiene copolymer rubber having a styrene content of 45 to 65% by weight, a content of butadiene derived vinyl groups of 20 to 70 parts by weight and a content of a styrene sequence consisting of not less than 8 bonded styrene monomer units of at largest 10% by weight of the above styrene content.

5 Claims, No Drawings

RUBBER COMPOSITION FOR TIRE TREAD

This application is a continuation of Ser. No. 07/471,443 filed Jan. 29, 1990, now abandoned.

BACKGROUND OF THE INVENTION

The present invention relates to a rubber composition for the tread of high performance tires having a large hysteresis loss, a high heat resistance and a remarkable grip.

As highway networks have been increasingly developed in recent years, various performance characteristics of automobiles, for example the high-speed performance, have been progressively improved, and in accordance with this, the demand has been increasingly strongly made that there should be provided high performance tires which can exhibit an improved stability with respect to such as the steering performance, the cornering performance and the braking performance at the time when automobiles mounting the tires are run at a high speed.

Also, in connection with racing tires which are put to service in a condition where the limit performances of high performance tires in general are competed with one another under severer service conditions than those under which high performance tires in general are put to service, as motor sports have grown to be increasingly popular of late there has grown a demand for further improving the tire performance, and today it is sought for to attain an improvement relating to the steering performance and the braking performance at critical times in service of tires.

To improve the performance characteristics required of high performance tires in general and racing tires as above, it is effective to improve the grip performance of the tires relative to road surfaces. For example, by increasing the hysteresis loss of the part (a rubber composition) forming the tire tread that contacts the road surfaces, it is possible to enhance the grip performance of the tires.

Then, to obtain a rubber composition having an increased hysteresis loss, conventionally it has been generally practiced to make use of an emulsion-polymerized styrene-butadiene copolymer rubber having a high styrene content with a high glass transition temperature (Tg).

In connection with styrene-butadiene copolymer rubbers, however, although their hysteresis loss can be increased as the styrene content therein is increased, their blowout resistance characteristic becomes lowered at the same time. Particularly, styrene-butadiene copolymer rubbers produced by an emulsion polymerization have such a broad molecular-weight distribution that they tend to show a considerably low blowout resistance, and they often fail to stand practical use in or for the rubber composition for racing tires which are used under a relatively severe service condition.

It has been also proposed in order to raise the hysteresis loss to blend in a diene rubber a butyl rubber or a halogenated butyl rubber. However, rubber compositions made with use of such blended rubbers tend to be poorly co-vulcanizable and poor in the breaking strength, and when they are used in or for high performance tires and racing tires which are subjected to severer service conditions than the high performance tires, a problem is posed that the resulting tires are prone to undergo a considerable abrasion and a blowout.

As indicated above, it is the status of the art in which there has not been a rubber composition provided, which is useful for tires which have a grip performance of such a high level as being required to attain in the cases of tires for racing cars including rally racing cars and of which it is unnecessary to concern about the heat resistance (blowout resistance).

BRIEF SUMMARY OF THE INVENTION

It is a primary object of the present invention to provide a rubber composition for use for the tread of high performance tires having a large hysteresis loss and remarkable heat resistance and grip performance.

It is a further object of the invention to provide a rubber composition for the tread of racing tires.

Such objects of the invention are attained according to the present invention by providing a rubber composition for tire treads which comprises 100 parts by weight of a rubber component comprising 10 to 100 parts by weight of a styrene-butadiene copolymer rubber produced by a solution polymerization and 90 to 0 parts by weight of a solution polymerization and 90 to 0 parts by weight of at least one of other diene rubbers having a glass transition temperature (Tg) of $-60°$ C. at lowest, and at least 70 parts by weight of a carbon black mixed in the rubber component, the styrene-butadiene copolymer rubber having a styrene content of 45 to 65% by weight, a content of butadiene derived vinyl groups of 20 to 70% by weight and a content of a styrene sequence consisting of not less than 8 bonded styrene monomer units of at largest 10% by weight of the above styrene content.

DESCRIPTION OF THE PREFERRED EMBODIMENTS

Broadly, the rubber composition according to the present invention comprises a rubber component and a carbon black, which will be respectively described in greater detail in what will follow.

(1) Rubber Component:

The rubber component in or for the present invention comprises 10 to 100 parts by weight of a styrene-butadiene copolymer rubber prepared by a solution polymerization (hereinafter abbreviated as S-SBR) and 90 to 0 parts by weight of at least one of other diene rubbers. That is to say, according to the invention, S-SBR is used either singly or in the form of a blend of at least 10 parts by weight thereof with at least one of other diene rubbers. Using such S-SBR as prepared by a solution polymerization, it is possible to control the amount of butadiene derived vinyl groups to be within a range of 20 to 70% by weight as later to be described in further detail. If the blending amount of S-SBR is less than 10 parts by weight, then it is impossible to attain a high hysteresis loss sought for according to the invention.

A. S-SBR

The S-SBR for use in or for the present invention has a high styrene content of 45 to 65% by weight or, more preferably, 48 to 58% by weight and an amount of butadiene derived vinyl groups of 20 to 70% by weight. When the styrene content is not more than 45% by weight, the hysteresis loss of the resulting rubber composition cannot be sufficiently high and it is then impossible to impart a remarkable grip characteristic to tire treads. On the other hand, if the styrene content exceeds 65% by weight, there become styrene blocks formed in the rubber composition and the blowout resistance of tires is adversely affected to a considerable extent. Such a high styrene content as exceeding 65% by weight is not desirable also in that the susceptivity of the modulus of elasticity to temperature is then increased.

Preferably, the content of butadiene derived vinyl groups is 30 to 60% by weight. If it does not reach 20% by weight, it is impossible to attain a sufficiently high hysteresis loss, while if it exceeds 70% by weight, it becomes difficult to effect polymerization of the copolymer and such a great content is not practically useful.

According to the invention, it is further required to meet that in the S-SBR, the content of a styrene sequence consisting of not less than 8 bonded styrene monomer units is 10% by weight or less based on a total styrene content or, more preferably, 5% by weight at largest, based on the styrene content.

The proportion of the chain styrene block sequence in the S-SBR can be analytically determined for example by cleaving the butadiene derived double bonds with ozone and then subjecting the decomposition products to a gel permeation chromatography [Preprint of Kobunski Gakkai (Highmolecular Chemical Society of Japan), Vol. 29, No. 9, page 2055 Oct. 14, 1980)].

If the proportion of the chain styrene block sequence exceeds 10% by weight, the blowout resistance of the resulting rubber composition is considerably low and such a high proportion is not desirable.

Generally, the S-SBR for use according to the present invention can be prepared by polymerizing styrene and butadiene together in a hydrocarbon solvent, using a polymerization initator comprising an organic lithium compound and a vinylation agent comprising a polar compound such as ether, amine or the like. Further, the polymerization may be effected under the co-existence of styrene and butadiene as above or by way of adding one of the monomers either continuously or intermittently to the other monomer. Also, it does not matter if it is effected without maintaining the polymerization temperature constant and while the temperature is permitted to change, for example to rise. It does not matter either, if the polymer obtained is such a one as having been subjected to a coupling, using a coupling agent such as halogenated tin for example, or a one having been preparatively oil-extended.

B. Other Diene Rubbers

For purposes of the present invention, useful other diene rubbers than the above described S-SBR are such ones as having a glass transition temperature (Tg) of −60° C. or above, which include for example emulsion-polymerized styrene-butadiene copolymer rubbers, polyisoprene rubbers, acrylonitrile-butadiene rubbers and butyl rubbers. From the standpoint of the tensile strength and the abrasion resistance, particularly preferably useful are emulsion-polymerized styrene-butadiene copolymer rubbers having a styrene content of 20 to 65%.

(2) Carbon Black:

Although basically no particular limitation is applicable to carbon blacks useful for purposes of the present invention, from the point of view for obtaining a high hysteresis loss and a high abrasion resistance, preferably the carbon black for use should be of a small particle type such as ISAF and SAF.

According to the invention, it is necessary that the carbon black is mixed in an amount of at least 70 parts by weight or, more preferably, at least 80 parts by weight based on 100 parts by weight of the above described rubber component. If the mixed amount of carbon black is less than 70 parts by weight, then it is impossible to obtain a rubber composition capable of imparting a sufficiently large hysteresis loss to tire treads.

The rubber composition according to the invention can be obtained by mixing altogether the above described S-SBR, at least one of other diene rubbers and carbon black in the above specified respective prescribed amounts or proportions, by any suitable method known per se.

Where necessary, it is possible to appropriately blend with the rubber composition according to the present invention any of additives normally utilized in rubber industries such as vulcanizing agent, accelerating agent, promoter assistant, anti-aging agent or antioxidant, filler, softening agent, plasticizer and so forth.

Now, the present invention will be described in further detail in conjunction with examples of the invention and comparative examples. The below described physical properties of rubber compositions and driving performance of tires built with use of the rubber compositions in their treads were determined according to the following methods.

Tensile Strength:

Tensile strength was measured according to JIS K6301 (corresponding to ASTM D3185).

Hysteresis Loss (tan δ):

Hysteresis loss values were determined on a viscoelastic spectrometer (a product of Iwamoto Seisakusho, Japan) at 20° C. A greater tan δ value represents a higher hysteresis loss and a more remarkable grip performance of tires.

Blowout resistance (Heat Resistance):

Comparative evaluations of the blowout resistance were made with reference to H.B.U. (Heat Build Up) measured by a Goodrich flexometer. The degrees of the temperature rise after the lapse of 25 minites at an ambient temperature of 100° C. and under the conditions of 4.44 mm for the stroke, 15 kg for the load and 1800 rpm for the frequency were measured and taken as the H.B.U. values, which are shown by indices below with the value found of Comparative Example 1 taken as 100. The lower the index, the better the heat resistance.

Driving Performance:

Respective test tires were mounted on vehicles, which were run 10 rounds of a closed circuit of a distance of 4.41 km/round, and best lap times were determined of the respective tires, the determined values being shown in terms of indices below. A smaller value (index) means a shorter lap time and represents that the tire has a more remarkable grip performance.

EXAMPLE 1

(1) Preparation of S-SBR-A

Into a stainless-steel autoclave type reaction vessel of a capacity of 10 l, which was preparatively cleansed and dried and the resident air in which was preparatively substituted with dry nitrogen, there were charged 384 g of 1,3-butadiene, 416 g of styrene and 4500 g of cyclohexane. Then, 2.5 g of a vinylation agent comprising N,N,N',N'-tetramethylethylene diamine was added into the reaction vessel, and with 3.0 millimole of a catalyst comprising n-butyl lithium further added then, a polymerization was carried out at 50° C. for 6 hours while the reaction mixture was stirred. Then, after it was confirmed that the polymerization conversion reached 100%, 1.5 millimole of silicon tetrachloride was added into the vessel to effect a coupling reaction for 60 minutes, and the reaction was terminated with methanol. To the polymer solution taken out of the reaction vessel, 7 g of BHT was added (BHT: 2,6-di-tert-butyl-p-cresol), and after the solvent was then removed by steam stripping of the polymer solution, the residue was dried on a hot roll, followed by a reduced-pressure desiccation at 60° C. for 24 hours, to obtain S-SBR-A.

(2) Preparation of S-SBR-B

Except that the respective use amounts of 1,3-butadiene, styrene and N,N,N',N'-tetramethylethylene diamine were changed to 328 g, 472 g and 3.4 g respectively, the above described (1) preparation of S-SBR-A was repeated, to obtain S-SBR-B.

(3) Preparation of S-SBR-E

Into a stainless-steel autoclave type reaction vessel of a capacity of 10 l, which was preparatively cleansed and dried and the resident air in which was preparatively substituted with dry nitrogen, there were charged 360 g of 1,3-butadiene, 200 g of styrene and 4500 g of cyclohexane. Then, 0.3 g of a vinylation agent comprising N,N,N',N'-tetramethylethylene diamine was added into the reaction vessel, and with 3.0 millimole of a catalyst comprising n-butyl lithium further added then, a polymerization was carried out at 50° C. for 6 hours while the reaction mixture was stirred. Starting at 30 minutes after the initiation of the polymerization reaction, 240 g of butadiene was continuously added at a feed rate of 2.0 g/minute, and after it was confirmed that the polymerization conversion reached 100%, 1.5 millimole of silicon tetrachloride was added into the vessel. Thereafter, the above described (1) preparation of S-SBR-A was repeated to provide the intended polymer, S-SBR-E.

(4) Preparation of S-SBR-F

Into a stainless-steel autoclave type reaction vessel of a capacity of 10 l, which was preparatively cleansed and dried and the resident air in which was preparatively substituted with dry nitrogen, 4500 g of cyclohexane was charged, and 3.0 millimole of a catalyst comprising n-butyl lithium was added into the reaction vessel. Then, with the temperature inside the reaction vessel maintained at 90° C., a monomer blend comprising 424 g of 1,3-butadiene and 376 g of styrene was continuously added into the reaction vessel at a rate of 1.0 g/minute, and a polymerization was initiated. Then, after it was confirmed that the polymerization conversion reached 100%, 1.5 millimole of silicon tetrachloride was added into the vessel. Thereafter, the above described (1) preparation of S-SBR-A was repeated to provide the intended polymer, S-SBR-F.

EXAMPLE 2

Using the S-SBR-A, -B, -E and -F obtained in the above Example 1 and shown in the below Table 1 and other SBR also shown in Table 1, and according to the mixing recipe (parts by weight) shown in the below Table 2, a variety of rubber compositions was prepared, and their physical properties after vulcanization were determined. The below Table 2 also enters the results of determinations.

Also, test tires were built, using the above prepared rubber compositions in their treads, and with the respective tires mounted on test cars, their respective driving performances were determined. The results of determinations are further shown in Table 2 below.

TABLE 1

|  | Content of bond styrene (wt. %) | Content of vinyl in butadiene (%) | Content of chain styrene block sequence (wt. %) |
| --- | --- | --- | --- |
| S-SBR-A | 54.5 | 50.9 | 1.0 |
| S-SBR-B | 60.1 | 47.8 | 0.3 |
| S-SBR-C[1)] | 59.7 | 37.6 | 1.1 |
| S-SBR-D[2)] | 60.3 | 49.2 | 13.2 |
| S-SBR-E | 25.3 | 50.4 | 0.2 |
| S-SBR-F | 46.5 | 12.1 | 0.1 |
| SBR 1721[3)] | 41.2 | 13.5 | 0.0 |
| E-SBR[4)] | 48.7 | 14.2 | 0.0 |

Notes:
[1)]and [2)]each a trial product made by Nippon Zeon Co., Ltd;
[3)]an emulsion-polymerized styrene-butadiene copolymer rubber (Tg: −28° C.) commercially obtainable at Shell Nederland Chemie B.V.;
[4)]an emulsion-polymerized styrene-butadiene copolymer rubber (Tg: −16° C.), a trial product; and
The bond styrene content and the micro-structure in butadiene: determined by the infrared analysis method of L. H. Humpton et al [Analytical Chem., 21, 923 (1949)].

TABLE 2

|  | Comparative Example | | Example (Present Invention) | | | | | | Comparative Example | | | |
| --- | --- | --- | --- | --- | --- | --- | --- | --- | --- | --- | --- | --- |
|  | 1 | 2 | 1 | 2 | 3 | 4 | 5 | 6 | 3 | 4 | 5 | 6 |
| Components |
| S-SBR-A |  |  | 100 | 30 | 70 |  |  |  |  |  |  | 30 |
| S-SBR-B |  |  |  |  |  | 40 |  |  |  |  |  |  |
| S-SBR-C |  |  |  |  |  |  | 100 | 50 |  |  |  |  |
| S-SBR-D |  |  |  |  |  |  |  |  | 70 |  |  |  |
| S-SBR-E |  |  |  |  |  |  |  |  |  | 30 |  |  |
| S-SBR-F |  |  |  |  |  |  |  |  |  |  | 30 |  |
| SBR 1721 | 100 |  |  |  | 30 | 60 |  |  | 30 | 70 | 70 |  |
| E-SBR (trial sample) |  | 100 |  | 70 |  |  |  | 50 |  |  |  |  |
| SAF carbon black*[1] | 120 | 120 | 120 | 120 | 120 | 120 | 120 | 120 | 120 | 120 | 120 | 50 |
| Zinc oxide | 3 | 3 | 3 | 3 | 3 | 3 | 3 | 3 | 3 | 3 | 3 | 3 |
| Stearic acid | 2 | 2 | 2 | 2 | 2 | 2 | 2 | 2 | 2 | 2 | 2 | 2 |
| Anti-aging agent*[2] | 1 | 1 | 1 | 1 | 1 | 1 | 1 | 1 | 1 | 1 | 1 | 1 |
| Aroma oil*[3] | 115 | 115 | 115 | 115 | 115 | 115 | 115 | 115 | 115 | 115 | 115 | 5 |
| Vulcanization promoter*[4] | 1.7 | 1.7 | 1.7 | 1.7 | 1.7 | 1.7 | 1.7 | 1.7 | 1.7 | 1.7 | 1.7 | 1.5 |
| Sulfur | 2.5 | 2.5 | 2.5 | 2.5 | 2.5 | 2.5 | 2.5 | 2.5 | 2.5 | 2.5 | 2.5 | 2.5 |
| Physical Properties of vulcanized products*[5] |
| Tensile strength (kg/cm$^2$) | 131 | 128 | 115 | 126 | 120 | 125 | 123 | 125 | 125 | 124 | 130 | 295 |
| Elongation (%) | 680 | 625 | 580 | 645 | 620 | 615 | 600 | 610 | 640 | 670 | 670 | 450 |
| 300% Tensile stress (kg/cm$^2$) | 51 | 55 | 53 | 52 | 52 | 51 | 54 | 54 | 57 | 48 | 50 | 187 |
| Heat resistance (index) | 100 | 100 | 94 | 97 | 97 | 100 | 91 | 97 | 125 | 88 | 100 | 52 |
| tan δ | 0.895 | 1.145 | 1.485 | 1.254 | 1.336 | 1.235 | 1.435 | 1.278 | 1.415 | 0.815 | 0.910 | 0.462 |
| Running test on actual cars | 102 | 100 | 97 | 98 | 98 | 98 | 97 | 98 | 99 | 103 | 103 | 118 |

TABLE 2-continued

| | Comparative Example | | Example (Present Invention) | | | | | | Comparative Example | | | |
|---|---|---|---|---|---|---|---|---|---|---|---|---|
| | 1 | 2 | 1 | 2 | 3 | 4 | 5 | 6 | 3 | 4 | 5 | 6 |
| Running performance (index) | | | | | | | | | | | | |

Notes:
*[1] DIABLACK A (a product of Mitsubishi Kasei K. K., Japan);
*[2] N-(1,3-dimethylbutyl-N'-phenyl-p-phenylene diamine;
*[3] total amounts of oil component in the oil-extended polymer and the oil component added in the mixing;
*[4] N-oxydiethylene-2-benzothiazylsulfenamide; and
*[5] Vulcanization was operated at 160° C. for 25 minutes.

The above Table 2 clearly shows that when compared with the rubber compositions of Comparative Examples 1 and 2, the rubber composition of each of Examples (present invention) has a higher tan δ value and a heat resistance (blowout resistance) which is not lowered. In connection with the results of the tire running tests, too, it is seen that tires built with use of the rubber composition according to the invention have a remarkably improved grip performance and can exhibit desirable driving performance. It is further seen that the rubber compositions of Comparative Examples 3 to 6 are relatively poor in either the heat resistance or the tan δ value.

As described above, the rubber composition according to the present invention comprises a particular styrene-butadiene copolymer rubber prepared by a solution polymerization, so that when it is used in or for tire treads, it can provide a tire having remarkably improved heat resistance, hysteresis loss and grip performance relative to road surfaces. It is advantageously useful particularly for high performance tires and racing tires including those for rally racing.

What is claimed is:

1. A rubber composition for tire treads, which comprises 100 parts by weight of a rubber component comprising 10 to less than 100 parts by weight of a styrene-butadiene copolymer rubber (A) produced by solution polymerization and up to 90 parts by weight of a styrene-butadiene copolymer rubber (B) produced by an emulsion polymerization, and at least 70 parts by weight of a 2. A rubber composition for tire treads, which comprises 100 parts by weight of a rubber component comprising 10 to less than 100 parts by weight of a styrene-butadiene copolymer rubber (A) produced by solution polymerization and up to 90 parts by weight of a styrene-butadiene copolymer rubber (B) produced by an emulsion polymerization, and at least 70 parts by weight of a carbon black mixed in the rubber component, said styrene-butadiene copolymer rubber (A) having a styrene content of 45 to 65% by weight, a content of butadiene-derived vinyl groups of 20 to 70% by weight, and a content of a styrene sequence consisting of not less than 8 bonded styrene monomer units of up to 10% by weight of the above styrene content, said styrene butadiene copolymer rubber (B) having a glass transition temperature of −28° C. or above and a styrene content of 40 to 65% by weight.

3. A rubber composition as claimed in claim 2, wherein said content of butadiene derived vinyl groups is 30 to 60% by weight.

4. A rubber composition as claimed in claim 2 wherein said styrene concentration in said copolymer rubber (A) is 55 to 65% by weight and said butadiene derived vinyl content in said copolymer (A) is 35 to 65% by weight.

5. A rubber composition as claimed in claim 2, wherein said carbon black is small particle carbon black selected from the group consisting of ISAF and SAF.

* * * * *

UNITED STATES PATENT AND TRADEMARK OFFICE
CERTIFICATE OF CORRECTION

PATENT NO. : 5,194,485
DATED : March 16, 1993
INVENTOR(S) : Yasushi KIKUCI, Masayoshi DAIO, Kazuyoshi KAYAMA, Hideyuki OISHI, Shuichi AKITA and Fumitoshi SUZUKI It is certified that error appears in the above-identified patent and that said Letters Patent is hereby corrected as shown below:

Column 8:

Claim 1, line 13, should continue with the following:

--carbon black mixed in the rubber component, said styrene-butadiene copolymer rubber (A) consisting essentially of a styrene content of 45 to 65% by weight, a content of butadiene-derived vinyl groups of 20 to 70% by weight, and a content of a styrene sequence consisting of not less than 8 bonded styrene monomer units of up to 10% by weight of the above styrene content, said styrene-butadiene copolymer rubber (B) having a glass transition temperature of -60°C or above and a styrene content of 20 to 65% by weight,--

Signed and Sealed this

Eleventh Day of January, 1994

Attest:

BRUCE LEHMAN

Attesting Officer  Commissioner of Patents and Trademarks